United States Patent [19]

Kotabe et al.

[11] Patent Number: 5,712,738
[45] Date of Patent: Jan. 27, 1998

[54] METHOD OF CONTROLLING SIGNAL LINES AMONG AUDIO AND/OR VIDEO APPARATUS

[75] Inventors: Noriko Kotabe, Chiba; Yoshio Osakabe, Kanagawa; Yasuo Kusagaya; Shigeo Tanaka, both of Tokyo; Akira Katsuyama, Kanagawa; Hiroshi Yamazaki, Kanagawa; Kouichi Sugiyama, Kanagawa; Makoto Sato, Kanagawa, all of Japan

[73] Assignee: Sony Corporation, Tokyo, Japan

[21] Appl. No.: 527,748

[22] Filed: Sep. 13, 1995

Related U.S. Application Data

[63] Continuation of Ser. No. 177,401, Jan. 5, 1994, abandoned.

[30] Foreign Application Priority Data

Jan. 20, 1993 [JP] Japan ............................. 5-024688

[51] Int. Cl.$^6$ ................................................ G11B 5/86
[52] U.S. Cl. ................................................ 360/15; 395/438
[58] Field of Search .......................... 360/15, 69, 31, 360/33.1; 359/335; 369/2, 30, 47, 54, 58, 84; 395/438, 439, 404, 601

[56] References Cited

U.S. PATENT DOCUMENTS

| | | | |
|---|---|---|---|
| 4,771,375 | 9/1988 | Beglin et al. | 395/438 |
| 5,321,846 | 6/1994 | Yokota et al. | 455/4.2 |
| 5,371,553 | 12/1994 | Kawamura et al. | 348/734 |
| 5,475,835 | 12/1995 | Hickey | 395/600 |
| 5,506,986 | 4/1996 | Healy | 395/438 X |
| 5,519,844 | 5/1996 | Stallmo | 395/404 X |
| 5,561,815 | 10/1996 | Takata et al. | 395/439 X |
| 5,584,006 | 12/1996 | Reber et al. | 360/13 X |

FOREIGN PATENT DOCUMENTS

A0482952  4/1992  European Pat. Off. .

OTHER PUBLICATIONS

Patent Abstract of Japan, vol. 13, No. 203 (P-870), May 15, 1989.

*Primary Examiner*—Andrew L. Sniezek
*Attorney, Agent, or Firm*—Jay H. Maioli

[57] ABSTRACT

A method of controlling signal lines among a number of audio/video units in a system where a central unit including a selector and the other audio/video units are mutually connected via a single control bus and also via audio/video signal cables includes the steps of enabling the central unit to manage identification numbers of the audio/video units on the control bus and also connection data among the audio/video units, classifying the audio/video units in accordance with the respective categories, connecting the signal line between one of the audio/video units and another one of the units, enabling one audio/video unit to designate by category the other audio/video unit to be connected and, after such designation, enabling the central unit to select the specific audio/video unit that satisfies the requirement, out of all of the audio/video units of the designated category, and then switching the selector of the central unit thereby connecting the desired signal line between the relevant audio/video units.

24 Claims, 4 Drawing Sheets

FIG. 2A Sctl

| START BIT | MODE | SOURCE | DESTINATION | CONTROL FIELD | MAIN DATA | END BIT |
|---|---|---|---|---|---|---|
| SBIT | MDDT | SS | DD | CFLD | MD (10~30) | END B |

FIG. 2B  10

| CONNECTION REQUEST | DESTINATION APPARATUS | VIDEO DEFINITION | VIDEO NO. | AUDIO DEFINITION | AUDIO NO. |
|---|---|---|---|---|---|
| 11 | 12 | 13 | 14 | 15 | 16 |

FIG. 2C  20

| RECORDING | RECORDING DIRECTION | VIDEO DEFINITION | VIDEO NO. | AUDIO DEFINITION | AUDIO NO. |
|---|---|---|---|---|---|
| 21 | 22 | 23 | 24 | 25 | 26 |

FIG. 2D  30

| STATE REPORT | CATEGORY | STATE | DETAILED STATE | TRANSITION COMPLETE |
|---|---|---|---|---|
| 31 | 32 | 33 | 34 | 35 |

FIG. 3A
10

| 11 | 12 | 13 | 14 | 15 | 16 |
|---|---|---|---|---|---|
| CONNECTION REQUEST | VTR | NORMAL | ◎ | NORMAL | ◎ |

FIG. 3B
20

| 21 | 22 | 23 | 24 | 25 | 26 |
|---|---|---|---|---|---|
| RECORDING | FORWARD DIRECTION | NORMAL | ① | NORMAL | ① |

FIG. 3C
30

| 31 | 32 | 33 | 34 | 35 |
|---|---|---|---|---|
| STATE REPORT | DECK | PLAYBACK | FORWARD; REGULAR SPEED | COMPLETE |

METHOD OF CONTROLLING SIGNAL LINES AMONG AUDIO AND/OR VIDEO APPARATUS

This is a continuation of application Ser. No. 08/177,401 filed Jan. 5, 1994 now abandoned.

BACKGROUND OF THE INVENTION

1. Field of the Invention

The present invention relates to a method of controlling signal lines among a plurality of audio and/or video units.

2. Description of the Related Art

Although audio and video apparatus inclusive of a video tape recorder, a laser disc player and so forth are usable individually as complete products, it is typical practice to constitute an audio/video system by combining these units with another apparatus equipped with a display function, such as a television receiver or monitor.

FIG. 4 shows an exemplary audio/video system that consists of such combined units including a television receiver 1, a first video tape recorder 2, a second video tape recorder 3 and a laser disc player 4. The television receiver 1 serves also as a control unit for concentrating the control of the entire audio/video system and has a selector (not shown) and so forth therein for selectively switching the various signals. There are some other cases where the selector is provided independently of the television receiver 1 and where the independent selector functions as a central unit in the system.

The audio/video units 1 through 4 are mutually connected via video and audio signal cables as indicated by solid lines in FIG. 4, and a common control bus 9 is provided as indicated by a broken line for connecting the individual units 1 through 4. Specific identification numbers constituting intra-system addresses are preset for the various audio/video units, and both identification numbers and operation contents are designated via the control bus 9. Hereinafter audio and video signals will be referred to as AV signals.

In such audio/video system where every AV signal is accessed through the TV receiver 1, the following control methods are advantageously used for accessing the signals.

1. When any unit of the audio/video units 2 through 4, except the central units 1, needs connection of its signal line to some other audio/video unit, a request for connection of the signal line is sent to the central unit 1 and, simultaneously, the identification number for designating the other unit to be connected is outputted via the control bus 9 thereby specifying the other unit.

2. The request for connection in paragraph 1. above is executed with respect to each of the audio signals, and the video signals individually.

3. In the case of realizing a dubbing function or the like, first the signal line is connected and then a request for recording is sent to the VTR 2 or VTR 3.

By the procedure mentioned above, the AV signal can be accessed as desired among the audio/video units 1 through 4, and the central unit 1 is capable of concisely controlling or managing the audio/video units 2 through 4.

In the above audio/video system consisting of four units 1 through 4, when the signal line is to be connected between one audio/video unit and another audio/video unit, there exists the necessity of checking the identification number of the other audio/video unit. Furthermore, in the case where the other audio/video unit is one of the two VTRs 2 or 3 installed as in the example of FIG. 4, it is necessary to check which of the signal lines is to be connected for the VTR 2 or 3. Consequently a program is required for checking the identification number of the other audio/video unit and also for selecting the connection of the desired signal line. Furthermore, random access memory areas are required for storing the results of such identification checks.

In addition, when it is desired to connect both video and audio signals, there arises the necessity of sending two requests individually for the respective connections. Therefore, when accessing command signals for such requests, in an exemplary case where the access to one command signal requires 150 msec and the time interval between one command signal and the next one is 50 msec, it follows that the control bus 9 is used for a total period of 350 msec, and the remaining audio/video units are not connectable via the bus 9 during such period of time.

In the case of dubbing, for example, a request for connection of the signal line and a request for recording by the VTR need to be executed individually. Therefore, in this case also, the control bus 9 is rendered unusable with regard to the remaining audio/video units for a time period of 350 msec.

Furthermore, upon occurrence of any change in the state of any of the audio/video units' apparatus 1 through 4, it becomes necessary to make a decision as to whether the connections of the entire signal lines in the audio/video system must be switched or the current connections are permissible, and selective switching is preferred, a request for changing the connection of the signal line needs to be sent to the central apparatus 1.

SUMMARY OF THE INVENTION

It is an object of the present invention to solve the above problems observed in the related art by providing an improved method that easily controls connection of signal lines with facility among a plurality of audio and/or video units constituting an audio/video system.

According to one aspect of the present invention, there is provided a method of controlling signal lines among a plurality of audio/video units in a system where the central unit for control and the other audio/video units are mutually connected via a single control bus and also via video and/or audio signal cables, the central unit having a selector for selectively switching a video signal or an audio signal accessed by the audio/video unit. The method comprises the procedure of enabling the central unit to manage identification numbers of the audio/video units on the control bus and also connection data among the audio/video units; classifying the plurality of audio/video units in accordance with the respective categories; connecting the signal line between one of the audio/video units and some other desired unit by enabling the one audio/video unit to designate by category the other desired audio/video unit to be connected; and after such designation, enabling the central unit to select the specific audio/video unit that satisfies the requirement, out of the entire audio/video system of the designated category; and then switching the selector of at least the central unit to thereby connect the desired signal line between the relevant audio/video units.

According to another aspect of the present invention, there is provided a central unit for controlling signal lines among audio/video units in a system where the central unit and the audio/video units are mutually connected via a single control bus and also via video and/or audio signal cables, the central apparatus having a selector for selectively switching a video signal or an audio signal accessed by the audio/video unit. The central unit is capable of managing identification numbers of the audio/video units on the control bus and also connection data among the audio/video units. The plurality of audio/video units are classified in accordance with the respective categories and, when the signal line is to be connected between one of the audio/video units and some other desired unit, the one audio/video unit designates the other audio/video unit as a destination by category. After such designation, the central unit selects the specific audio/video unit that satisfies the requirement, out of the audio/video units of the designated category, and then switches the selector of at least the central unit to thereby connect the desired signal line between the relevant audio/video units.

In the above system connection of the video signal line and of the audio signal line are executed simultaneously by a single control signal. Each of the audio/video units automatically reports a change of the state thereof to the central unit via the control bus, and then the central unit controls the switching action of the selector in response to the report.

According to a further aspect of the present invention, there is provided an audio/video system consisting of a plurality of audio/video units controlled by a signal-line controlling central unit that is connected to the audio/video units via a single control bus and also via video and/or audio signal cables and has a selector for selectively switching a video signal or an audio signal accessed by the audio/video units. In this system, the central unit manages identification numbers of the audio/video units on the control bus and also connection data among the audio/video units. The plurality of audio/video units are classified in accordance with the respective categories and, when the signal line is to be connected between one of the audio/video units and some other desired unit, the one audio/video unit acts as a source and designates the other audio/video unit as a destination by category. After such designation, the central unit selects the specific audio/video unit that satisfies the requirement, out of the audio/video units of the designated category, and then switches the selector of at least the central unit to thereby connect the desired signal line between the relevant audio/video units.

When connection of the signal line is required from one of the audio/video units other than the central unit, there is no necessity of checking the identification number of the other audio/video units to be connected. Moreover, even if a plurality of audio/video units are present to be connected in the system, no process is needed for selection either. Therefore, the program needed in the related art for specifying the identification number is no longer necessary, consequently decreasing the required capacity of the read only memory and decreasing the production cost of the controlling microcomputer. Furthermore, the random access memory area for storing the result of the check is not needed either, so as to eventually reduce the production cost in view of this point as well.

In the case of connecting both video and audio signals, there exists no necessity of sending two requests individually for the connection, and a single request is sufficient to achieve the desired connection to thereby shorten the time of using the control bus. Accordingly, the response time from the user's manipulation of the audio/video units to the execution of the command is minimized to consequently enhance the operational convenience.

Also in the case of executing a dubbing function, for example, there is no necessity of individually sending a request for connection of the signal line and a request for recording by the video tape recorder, and a single request is sufficient to meet the requirement, hence shortening the time of using the control bus. Thus, similarly to the above situation, the response time from the user's manipulation of the audio/video units to the execution of the command is also shortened to eventually enhance the operational convenience and facility.

In the conventional method, upon occurrence of a change in the state of any audio/video unit other than the central unit, it is necessary to make a decision as to whether the connection of all of the signal lines in the whole system must be switched or the current connection is permissible. When selective switching is preferred, a request for changing the signal line connection needs to be sent to the central unit, however, according to the present invention, such management is no longer necessary, so as to possibly minimize the required capacity of the read only memory for the program of the computer, hence realizing further decrease of the production costs.

In addition, the central unit is capable of judging the states of the whole audio/video system and connecting the signal lines properly. Therefore a variety of functions can be realized with ease, inclusive of determining the priority order of the individual audio/video units, or executing none of switching action in case any audio/video unit placed previously in a playback mode is continuously maintained in the same operation mode. Thus, high flexibility is attainable in controlling the entire system.

The above and other features and advantages of the present invention will become apparent from the following description which will be given with reference to the illustrative accompanying drawings.

BRIEF DESCRIPTION OF THE DRAWINGS

FIGS. 2A–2D are schematic diagrams showing an exemplary signal format;

FIGS. 3A–3C are partial schematic diagrams showing another exemplary signal format.

DESCRIPTION OF THE PREFERRED EMBODIMENT

Figure 1:
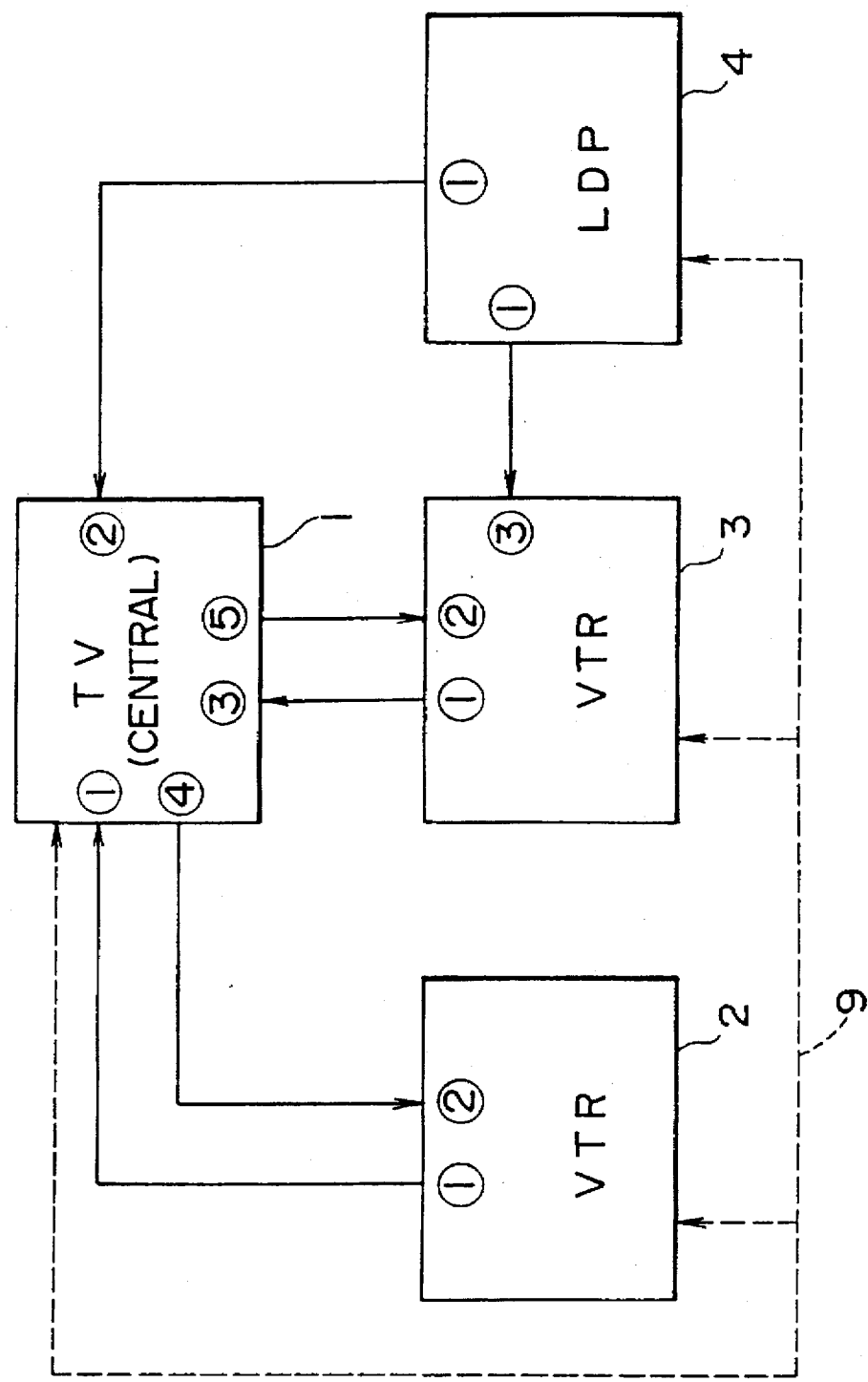
FIG. 1 is a block diagram of a preferred embodiment for carrying out the method of the present invention.
Figure 4:
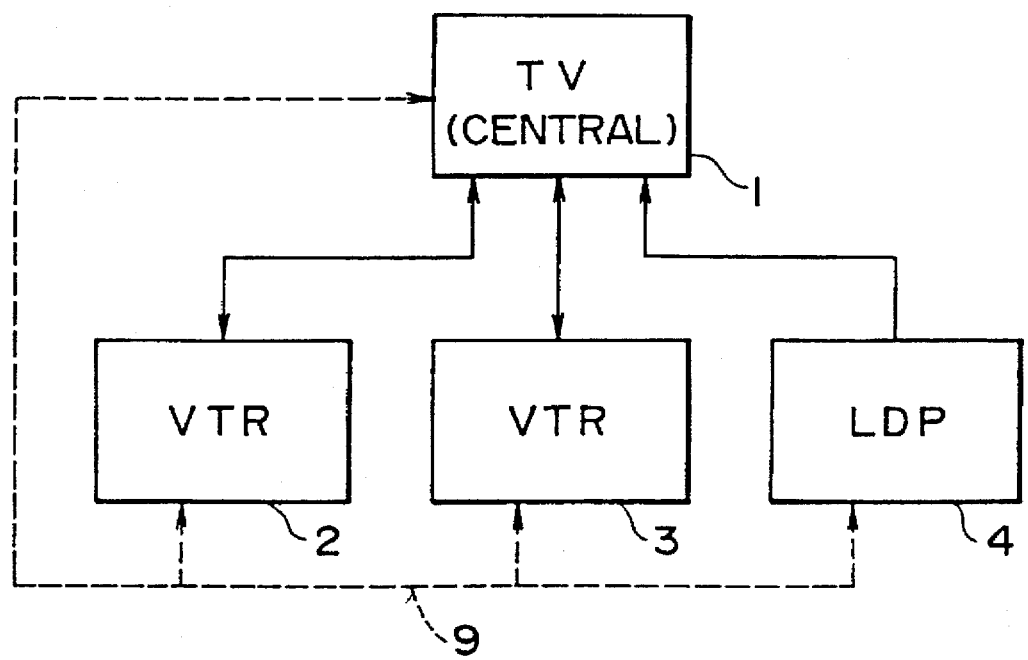
FIG. 4 is a block diagram of a conventional system known in the related art.

In FIG. 1, audio/video units 1 through 4 are classified by a predetermined code in accordance with the operational categories of products and is given a specific identification number. For example: the TV Receiver is "20H", the Video tape recorder is "21H", and the Laser disc player is "22H".

An output terminal O and an input terminal I of the VTR 2 are connected respectively to an input terminal and an output terminal O of the TV receiver 1, and an output terminal O and an input terminal I of the VTR 3 are connected respectively to an input terminal and an output terminal of the TV receiver 1. Meanwhile output terminals O of the laser disc player LDP 4 are connected respectively to an input terminal I of the VTR 3 and an input terminal I of the TV receiver 1. A control bus 9 is connected among such audio/video units apparatus 1 through 4.

A control signal SCTL having a format shown in FIG. 2A is accessed via the bus 9 among the audio/video units 1 through 4. More specifically, the control signal SCTL sequentially comprises, from the beginning as shown in FIG. 2A, a start bit SBIT indicating the start of the signal SCTL, mode data MDDT, source data SS indicating the identification number of the source audio/video unit from which the signal SCTL originates, destination data DD indicating the identification number of the destination audio/video unit where the signal SCTL terminates, control field data CFLD, main data MD subsequent thereto, and an end bit END B.

In this example, the main data MD includes data 10, 20 and 30 having the formats shown in FIGS. 2B, 2C, and 2D, respectively. The first main data 10 is used as a request for connection from any of the audio/video units 2 through 4 to the central unit 1 and also for batch control of the connection of the video and audio signal lines.

For this purpose, the data 10 sequentially comprises, from the beginning as shown in FIG. 2B, data 11 signifying that the data 10 is a request command for connection of the signal line, data 12 indicating the category of the desired destination audio/video unit to be connected, data 13 indicating the definition of the video signal, data 14 of the terminal number for access to the video signal, data 15 indicating the definition of the audio signal, and data 16 of the terminal number for access to the audio signal.

The data 13 signifies whether the video signal to be accessed is a normal video signal, a high-definition analog video signal, or a digital video signal. The terminal numbers represented by the data 14 and 16 indicate either the output terminal or the input terminal of the source audio/video unit 2 through 4 having outputted the main data 10 therefrom. If the data 14 and 16 are set to mutually equal numbers, the video and audio signal lines can be connected interlockingly with each other. These data may be set to mutually different numbers as well.

When the data 14 through 16 are hexadecimal "FF", such data signify maintenance of the preceding state, and it is also possible to change merely the connection of the video signal line or that of the audio signal line. The data 15 signifies whether the audio signal to be accessed is a normal audio signal, a high-definition analog audio signal, or a digital audio signal.

The second main data 20 serves as a request for recording to the VTR while serving to designate the signal to be recorded. The data 20 sequentially comprises, from the beginning as shown in FIG. 2C, data 21 indicating execution of a recording operation, data 22 indicating the direction of the signal, data 23 indicating the definition of the video signal, data 24 indicating the terminal number for access to the video signal, data 25 indicating the definition of the audio signal, and data 26 indicating the terminal number for access to the audio signal. The terminal numbers represented by the data 24 and 26 indicate the output terminal or the input terminal of the audio/video units 1 through 4 having outputted the main data 20 therefrom.

The third main data 30 is outputted voluntarily from the audio/video unit for selectively switching the internal connection of the video or audio signal line by that audio/video unit. The main data 30 sequentially comprises, from the beginning as shown in FIG. 2D, data 31 signifying that the main data 30 is a report of the operating state, data 32 indicating the category, data 33 indicating the operating state, data 34 for supplementing the details of the operating state, and data 35 indicating a transition to the desired operating state or completion of such transition. Nevertheless, the category data 32 included in the main data 30 denotes that the operating state indicated by the data 33 relates to a power supply circuit, a tuner, or a tape deck mechanism of the specific audio/video unit having outputted the main data 30.

In the embodiment described above, when the AV signal reproduced by the LDP 4 is to be dubbed in the VTR, the control signal SCTL including the main data shown in FIG. 3A is outputted from the LDP 4 via the bus 9 in accordance with the format of FIG. 2B. In this case, the data SS indicating the identification number of the source audio/video unit relative to the control signal SCTL designates the LDP 4, and the data DD indicating the identification number of the destination audio/video unit relative to the control signal SCTL designates the central unit 1.

The main data MD included in the control signal SCTL corresponds to the data 10 in this case, and the data 11 signifies a request for connection. The data 12 signifies the category of the VTR, and the data 13 indicates the definition of the video signal outputted from the LDP 4, for example, the data signifying a normal video signal. Since the video signal is delivered from the output terminal of the LDP 4, the data 14 indicates the output terminal thereof. Further the data 15 indicates the definition of the audio signal outputted from the LDP 4, for example, the data signifying a normal audio signal. Since the audio signal is delivered from the output terminal of the LDP 4, the data 16 indicates the output terminal.

The control signal SCTL outputted from the LDP 4 via the bus 9 is supplied to the audio/video units 1 through 3. This control signal SCTL is rendered effective in the central unit 1 on the basis of the data SS and DD included in the signal SCTL, and the central unit 1 detects that the source audio/video unit relative to the control signal SCTL is the LDP 4.

As the main data MD included in the control signal SCTL is the data 10 in this case, the central unit 1 detects from the data 11 that the request is for connection and also detects from the data 12 that the desired connection is to the VTR. Since the central unit 1 knows the entire constitution of the system, it selects the VTR 2 or 3 suited for recording. Supposing now that the VTR 2 is selected, the central unit 1 connects the input terminal thereof to the output terminal to which the selected VTR 2 is connected, thereby ensuring the AV signal line from the LDP 4 to the VTR 2.

When the central unit 1 executes a dubbing operation between the LDP 4 and the VTR 2, for example, the control signal SCTL including the main data 20 shown in FIG. 3B is outputted from the central unit 1 via the bus 9 in accordance with the format of FIG. 2C. In this case, the data SS indicating the identification number of the source unit of the control signal SCTL designates the central unit 1, and the data DD indicating the identification number of the destination audio/video unit relative to the control signal SCTL designates the VTR 2.

The main data MD included in the control signal SCTL corresponds to the data 20 in this example. The data 21 signifies execution of a recording operation, and the data 22 signifies that the signal is directed from the central apparatus 1 to the VTR 2. The data 23 indicates the definition of the video signal outputted from the central unit 1. Since the video signal is supplied to the input terminal of the VTR 2, the data 24 indicates the input terminal. Further the data 25 indicates the definition of the audio signal outputted from the central unit 1. Since the audio signal is supplied to the input terminal of the VTR 2, the data 26 indicates the input terminal.

Such control signal SCTL outputted from the central unit 1 via the bus 9 is supplied to the audio/video units 2 through 4. The control signal SCTL is rendered effective only in the VTR 2 on the basis of the data SS and DD included in the signal SCTL, so that the VTR 2 starts a recording operation in accordance with the data 20 of the control signal SCTL. Thus, dubbing from the LDP 4 to the VTR 2 is performed.

When the VTR 2 operates in a playback mode, the control signal SCTL including the main data 30 of FIG. 3C is outputted from the VTR 2 via the bus 9 upon the start of the playback operation. In this case, the data SS indicating the identification number of the source audio/video unit relative to the control signal SCTL designates the VTR 2, and the data indicating the identification number of the destination audio/video unit relative to the signal SCTL designates the central unit 1.

The main data MD included in the control signal SCTL corresponds to the data 30 in this example. The data 31 in the main data 30 represents a report on the operating state of the VTR 2, and the data 32 represents a report on the operating state of the tape deck mechanism in the VTR 2. The data 33 signifies that the state of the mechanism represented by the data 32 is a playback mode, and the data 34 signifies that the playback mode is executed in the forward direction at a regular speed. The data 35 signifies completion of a transition to the playback mode.

When the control signal SCTL outputted from the VTR 2 via the bus 9 is supplied to the audio/video units 2 through 4, the control signal SCTL is rendered effective only in the central unit 1 on the basis of the data SS and DD included in the signal SCTL. And thus the state of the VTR 2 is reported to the central unit 1.

Then the central unit 1 inspects the entire current status of the whole system and, if the result of such inspection is proper, the central unit 1 connects the input terminal thereof to appropriate video and audio circuits, not shown, whereby the picture and the sound reproduced by the VTR 2 are outputted from the TV receiver 1.

Suppose now that the report from the VTR 2 is received when the LDP 4 is in the playback mode, for example, and the reproduced picture and sound are being outputted from the TV receiver 1. In such a case, the connection to the LDP 4 can be maintained continuously, or a switching action can be executed to deliver the reproduced picture and sound obtained from the VTR 2. Such selection is presettable by the user or may be performed by the user each time on an interrupt basis.

As described above, when connection of the signal line is required from one source audio/video unit other than from the central unit 1, there is no necessity of checking the identification number of the other destination apparatus to be connected. Even if a plurality of audio/video units exist in the system, no process is needed for selection either. Therefore, the program needed in the related art for specifying the identification number is no longer necessary, consequently decreasing the required capacity of the read only memory and decreasing the production cost of the controlling microcomputer. Furthermore, the random access memory area for storing the result of the check is not needed either, so as to eventually reduce the production cost in view of this point as well.

In the case of connecting both video and audio signals, there exists no necessity of sending two requests individually for the connection, and a single request is sufficient to achieve the desired connection to thereby shorten the time of using the control bus 9. Accordingly, the response time from the user's manipulation of the audio/video units 2 through 4 to the execution of the request command is minimized to consequently enhance the operational convenience.

Also in the case of executing a dubbing function, for example, there is no necessity of individually sending a request for connection of the signal line and a request for recording by the VTR. A single request is sufficient to meet the requirement, hence, shortening the time of using the control bus 9. Thus, similarly to the above, the response time from the user's manipulation of the audio/video units 2 through 4 to the execution of the command is also shortened to eventually enhance the operational convenience and facility.

In the conventional method, upon occurrence of a change in the state of any audio/video units apparatus 2 through 4 other than the central unit 1, it is necessary to make a decision as to whether the connection of the entire signal lines in the whole AV system must be switched or the current connection is permissible. When selective switching is preferred, a request for changing the signal line connection needs to be sent to the central apparatus 1. According to the present invention, however, such management is no longer necessary, so as to eventually minimize the required capacity of the ROM for the program of the computer, hence realizing further decrease of the production cost.

In addition, the central unit 1 is capable of judging the states of the whole AV system and connecting the signal lines properly. Therefore, a variety of functions can be realized with facility, inclusive of determining the priority order of the individual audio/video units, or executing no of switching action in case any audio/video unit placed earlier in a playback mode is continuously maintained in the same operation mode. Thus, high flexibility is attainable in controlling the entire system.

Although the present invention has been described hereinabove with reference to the preferred embodiment, it is to be understood that the invention is not limited to such illustrative embodiment alone, and various modifications may be contrived without departing from the spirit or essential characteristics thereof, which is to be determined solely from the appended claims.

What is claimed is:

1. A method of controlling signal lines among a plurality of audio and video units including at least one video tape recorder and a laser disk player connected in a system, wherein a central unit for control and the audio and video units are mutually connected via a single control bus and via audio and video signal lines, the central unit having a selector for selectively switching a video signal or an audio signal accessed by one of the audio and video units, the method comprising the steps of:

managing in the central unit identification numbers of the plurality of audio and video units connected to the control bus and connection requirement data among the audio and video units;

classifying the plurality of audio and video units in accordance with their respective operational categories, wherein the one video tape recorder and any other video tape recorder connected in the system are of one operational category and the laser disk player is of another operational category;

designating by a source audio or video unit an operational category of a destination audio and video unit to be connected without specifying a particular audio or video unit within the designated operational category;

selecting by the central unit in accordance with said connection requirement data one of the audio and video units in the designated operational category; and switching the selector of the central unit to thereby connect a signal line between the source audio or video unit and the selected one of the audio or video units.

2. The method according to claim 1, wherein connecting the video signal line and connecting the audio signal line are selected simultaneously by a single control signal.

3. The method according to claim 1, wherein said selected audio and video unit is a recorder and said source unit that outputs the signal to be recorded is designated simultaneously by sending a recording request to the recorder.

4. The method according to claim 1, wherein each of the plurality of audio and video units detects a change of a state thereof and reports the change of state to the central unit via the control bus, and the central unit controls switching of the selector in response to the reporting.

5. The method according to claim 4, wherein the plurality of audio and video units includes a tape recorder and a disc player and said central unit controls switching the selector in response to the voluntary reporting to dub a reproduced signal obtained from said disc player to said tape recorder.

6. The method according to claim 4, wherein said plurality of audio and video units includes first and second tape recorder/players, and said central unit controls switching the selector in response to the reporting and enables said second tape recorder/player to dub a reproduced signal obtained from said first tape recorder/player to said second tape recorder/player.

7. The method according to claim 4, wherein the plurality of audio and video units includes one of a tape player and a disc player that reproduces a signal to be displayed on a television receiver, and said central unit controls switching the selector in response to the voluntary reporting and displays the reproduced signal on said television receiver.

8. The method according to claim 4, wherein said plurality of audio and video units includes one of a tape player and a disc player that reproduces a signal to be displayed on a television receiver, and said central unit controls power supply circuits of said audio or video units in response to the voluntary reporting.

9. Apparatus for controlling signal lines among a plurality of audio and/or video units including at least one video tape recorder and a laser disk player in a system, wherein a central apparatus connected to said audio and/or video units via a single control bus and also via video and/or audio signal lines and includes a selector for selectively switching a video signal or an audio signal accessed by one of said audio and/or video units, comprising:

management means formed in said central apparatus for managing respective identification numbers of said audio and/or video units on the control bus and for managing connection requirement data among said audio and/or video units; and means for classifying said plurality of audio and/or video units in accordance with respective operational categories, wherein the one video tape recorder and any other video tape recorder connected in the system are of one operational category and the laser disk player is of another operational category, wherein when a signal line is to be connected between a source one of said audio and/or video units and one audio and/or video unit of a desired operational category, said source audio and/or video unit designates said desired operational category without specifying a particular audio or video unit within the designated operational category and after such designation, said central apparatus selects one of the audio and/or video units of the designated operational category and then switches the selector of at least said central apparatus to connect the signal line between the source audio or video unit and the selected audio and/or video unit.

10. The apparatus according to claim 9, wherein connection of the video signal line and connection of the audio signal line are executed simultaneously by a single control signal.

11. The apparatus according to claim 9, wherein said selected audio and/or video unit is a recorder and said source audio and/or video unit that outputs a signal to be recorded is designated simultaneously with a recording request sent to said recorder.

12. The apparatus according to claim 9, wherein each of said plurality of audio and/or video units detects a change of a state thereof and reports the change of state to said central apparatus via the control bus, and said central apparatus controls switching of the selector in response to said report.

13. The apparatus according to claim 12, wherein said plurality of audio and/or video units includes a tape recorder and a disc player and said central apparatus controls switching the selector in response to said report to dub a reproduced signal obtained from said disc player to said tape recorder.

14. The apparatus according to claim 13, wherein said plurality of audio and/or video units includes one of a tape player and a disc player that reproduces a signal to be displayed on a television receiver, and said central apparatus controls power supply circuits of said audio and/or video units in response to said report.

15. The apparatus according to claim 12, wherein said plurality of audio and/or video units includes one of a tape player and a disc player that reproduces a signal to be displayed on a television receiver, and said central apparatus controls switching the selector in response to said report and displays the reproduced signal on said television receiver.

16. The apparatus according to claim 12, wherein said plurality of audio and/or video units includes first and second tape recorders and/or players and said central apparatus controls switching the selector in response to said report and enables said second tape recorder and/or player to dub a reproduced signal obtained from said first tape recorder and/or player to said second tape recorder and/or player.

17. A system having a plurality of audio and/or video units including at least one video tape recorder and a laser disk player controlled by a signal-line controlling central unit connected to said plurality of audio and/or video units via a single control bus and via video and/or audio signal lines and including a selector formed in the central unit for selectively switching a video signal or an audio signal accessed by one of said plurality of audio and/or video units, the system comprising:

management means formed in said central unit for managing identification numbers of said audio and/or video units on the control bus and for managing connection requirement data among said audio and/or video units; and means for classifying said plurality of audio and/or video units in accordance with respective operational categories, wherein the one video tape recorder and any other video tape recorder connected in the system are of one operational category and the laser disk player are of another operational category, wherein when the signal line is to be connected between a source one of said plurality of audio and/or video units and one audio and/or video unit of a desired operational category, said one source audio and/or video unit designates the desired operational category without specifying a particular audio or video unit within the designated operational category and after such designation said central unit selects one of the audio and/or video units of the designated operational category and then switches the selector of at least said central unit to connect the signal line between the one source audio or video unit and the selected audio and/or video unit.

18. The system according to claim 17, wherein connection of the video signal line and connection of the audio signal line are executed simultaneously in response to a single control signal.

19. The system according to claim 17, wherein said selected audio and/or video unit is a recorder and the one source audio and/or video unit that outputs a signal to be recorded is designated simultaneously with a recording request sent to said recorder.

20. The system according to claim 17, wherein each of said plurality of audio and/or video units detects a change of a state thereof and reports the change of state to said central unit via the control bus, and said central unit controls switching of the selector in response to said report.

21. The system according to claim 20, wherein said plurality of audio and/or video units includes a tape recorder and a disc player and said central unit controls switching the selector in response to said report to dub a reproduced signal obtained from said disc player to said tape recorder.

22. The system according to claim 20, wherein said plurality of audio and/or video units includes first and second tape recorders and/or players and said central unit controls switching the selector in response to said report and enables said second tape recorder and/or player to dub a reproduced signal obtained from said first tape recorder and/or player to said second tape recorder and/or player.

23. The system according to claim 20, wherein said plurality of audio and/or video units includes one of a tape player and a disc player that reproduces a signal to be displayed on a television receiver, and said central unit controls switching the selector in response to said report and displays the reproduced signal on said television receiver.

24. The system according to claim 20, wherein said plurality of audio and/or video units includes a tape player or a disc player that reproduces a signal to be displayed on a television receiver, and said central unit controls power supply circuits of said audio and/or video units in response to said report.

* * * * *